(No Model.)

J. A. GACKELER.
KETTLE LIFTER AND DRAINER.

No. 566,512. Patented Aug. 25, 1896.

Witnesses.
Joseph Post
Mabel A. Jones.

Inventor.
John A. Gackeler
By. Ithiel J. Cilley
Attorney.

UNITED STATES PATENT OFFICE.

JOHN A. GACKELER, OF GRAND RAPIDS, MICHIGAN, ASSIGNOR TO BENJAMIN VAN ANROY, OF SAME PLACE.

KETTLE LIFTER AND DRAINER.

SPECIFICATION forming part of Letters Patent No. 566,512, dated August 25, 1896.

Application filed May 8, 1896. Serial No. 590,774. (No model.)

*To all whom it may concern:*

Be it known that I, JOHN A. GACKELER, a citizen of the United States, residing at Grand Rapids, in the county of Kent and State of Michigan, have invented certain new and useful improvements in Kettle Lifters and Drainers, of which the following is a specification.

My invention relates to improvements in appliances for lifting a kettle and holding the cover to place while draining the water from the vegetables that have been cooked therein, and its objects are, first, to provide a kettle-lifter that may be manipulated to raise the bail of the kettle with one hand, and, second, to avert the danger of scalding the other hand when tilting the kettle to drain the water therefrom. I attain these objects by the mechanism illustrated in the accompanying drawings, in which—

Figure 1:
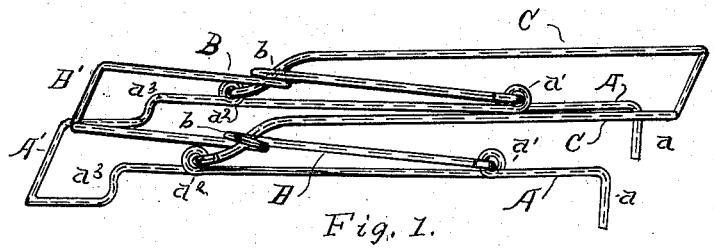
Figure 2:
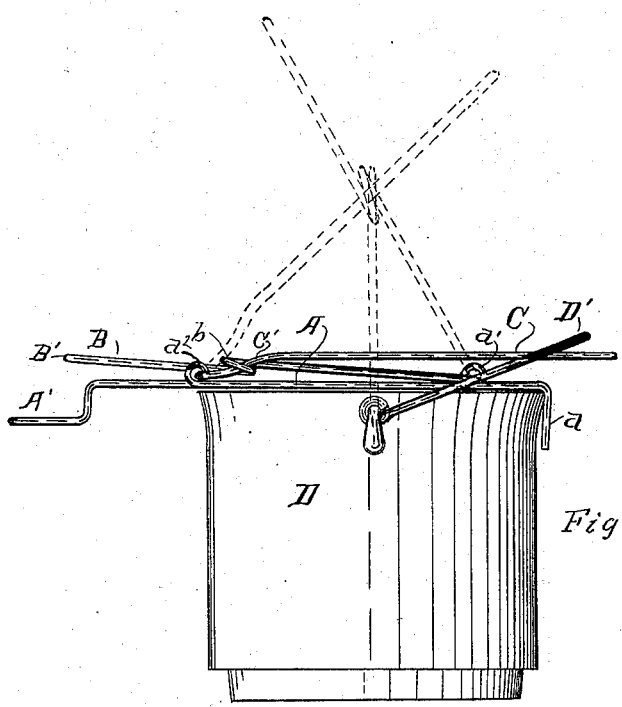

Figure 1 is a perspective of my device, and Fig. 2 is an elevation of a kettle with my device in position for use.

Similar letters refer to similar parts throughout the several views.

In constructing my device, I form the base A of wire bent U shape, as shown in Fig. 1, having the free ends bent downward so that they will pass down over the edge of the kettle, as at $a$ in Fig. 2, to prevent the kettle from sliding from under the drainer when draining water therefrom. This base extends back over the kettle-cover, and is provided with loop $a'$ for engaging similar loops on the ends of the hand-lever B, and a second pair of loops $a^2$, to which the ends of the bail-lever C is similarly pivoted or looped. On the opposite side of the kettle the base is thrown down, as at $a^3$, so that the handle A' will be below the top of the kettle for the purpose of averting the danger of scalding the hand by the escape of steam when draining water from the kettle.

The lever C is pivoted to the base at $a^2$, as hereinbefore stated, and is bent, substantially as shown at C', in position to pass through the loop $b$ on the hand-lever, and acts a double purpose: first, to allow the two levers to lie close to the base, and, second, to form inclines to facilitate raising it and the bail D', the body of the lever extending out far enough so that the bail cannot pass by it.

The lever B is pivoted at one end to the loops in the base at $a'$ and has loops $b$ in position to engage with the lever C. By taking hold of it (the lever B) at B' and raising it up this lever will raise the lever C and with it the bail D' to the position indicated by the dotted lines in Fig. 2, when the base may be taken hold of at A' and the kettle tipped to any desired position.

Having thus fully described my invention, what I claim as new, and desire to secure by Letters Patent of the United States, is—

In a kettle-lifter a base bent in U form and having its free ends bent down, a hand-lever and a bail-lever, said levers each pivoted at one end to the base, loops in the hand-lever in position to encircle the bail-lever, and inclines in the bail-lever where it passes through the hand-lever when down, substantially as, and for the purpose set forth.

Signed at Grand Rapids, Michigan, May 5, 1896.

JOHN A. GACKELER.

In presence of—
   F. L. STEWART,
   I. J. CILLEY.